US012588019B2

(12) United States Patent
Farhoodi

(10) Patent No.: US 12,588,019 B2
(45) Date of Patent: Mar. 24, 2026

(54) DETERMINING RADIO UNIT DL PRB SCHEDULING ON A PER-SYMBOL BASIS

(71) Applicant: Dell Products, L.P., Round Rock, TX (US)

(72) Inventor: Ahmad Farhoodi, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 360 days.

(21) Appl. No.: 18/352,449

(22) Filed: Jul. 14, 2023

(65) Prior Publication Data

US 2025/0024450 A1 Jan. 16, 2025

(51) Int. Cl.
H04W 72/1263 (2023.01)
H04W 52/02 (2009.01)
H04W 72/0446 (2023.01)

(52) U.S. Cl.
CPC ... H04W 72/1263 (2013.01); H04W 52/0216 (2013.01); H04W 72/0446 (2013.01)

(58) Field of Classification Search
CPC ......... H04W 72/1263; H04W 52/0216; H04W 72/0446
See application file for complete search history.

(56) References Cited

U.S. PATENT DOCUMENTS

| | | | | |
|---|---|---|---|---|
| 2021/0243840 A1* | 8/2021 | Raghothaman | ....... | H04L 5/0044 |
| 2022/0078631 A1* | 3/2022 | Salahuddeen | .......... | H04L 45/16 |
| 2023/0057921 A1* | 2/2023 | Sundaram | ............. | H04L 5/0023 |
| 2023/0066247 A1* | 3/2023 | Raeesi | ................ | H04B 7/0413 |
| 2023/0198689 A1* | 6/2023 | Li | ......................... | H04L 5/0007 |
| | | | | 370/329 |
| 2023/0328712 A1* | 10/2023 | Singh | ..................... | H04L 27/34 |
| | | | | 370/329 |

FOREIGN PATENT DOCUMENTS

WO 2022/060191 A1 3/2022

OTHER PUBLICATIONS

Farhoodi et al. "Open RAN Radio Unit Power Saving on Per-Symbol Basis" U.S. Appl. No. 17/823,643, filed Aug. 31, 2022. (34 pages).
Notice of Allowance received for U.S. Appl. No. 17/823,643, dated Dec. 5, 2024, 7 pages.
Notice of Allowance received for U.S. Appl. No. 17/823,643, dated Nov. 25, 2024, 100 pages.

* cited by examiner

*Primary Examiner* — Ricky Q Ngo
*Assistant Examiner* — David M Kayal
(74) *Attorney, Agent, or Firm* — Amin, Turocy & Watson, LLP

(57) ABSTRACT

Parsing of C-plane messages is described, e.g., C-plane messages that are communicated from an open RAN distributed unit (O-DU) to an open RAN radio unit (O-RU) in order to determine downlink physical resource block (PRB) scheduling ahead of subsequent U-plane communication. A counter can be constructed by the O-RU for each symbol to be communicated, where the counter reflects the number of PRBs scheduled for the associated symbol. From this information that is determined based on target C-plane messages, a PRB utilization ratio can be constructed on a per-symbol basis, which can be averaged over any desired time period and then leveraged to generate power saving opportunities or other beneficial opportunities at the O-RU in full compliance with Open RAN.

20 Claims, 12 Drawing Sheets

EXAMPLE DISAGGREGATED OPEN RAN (O-RAN)
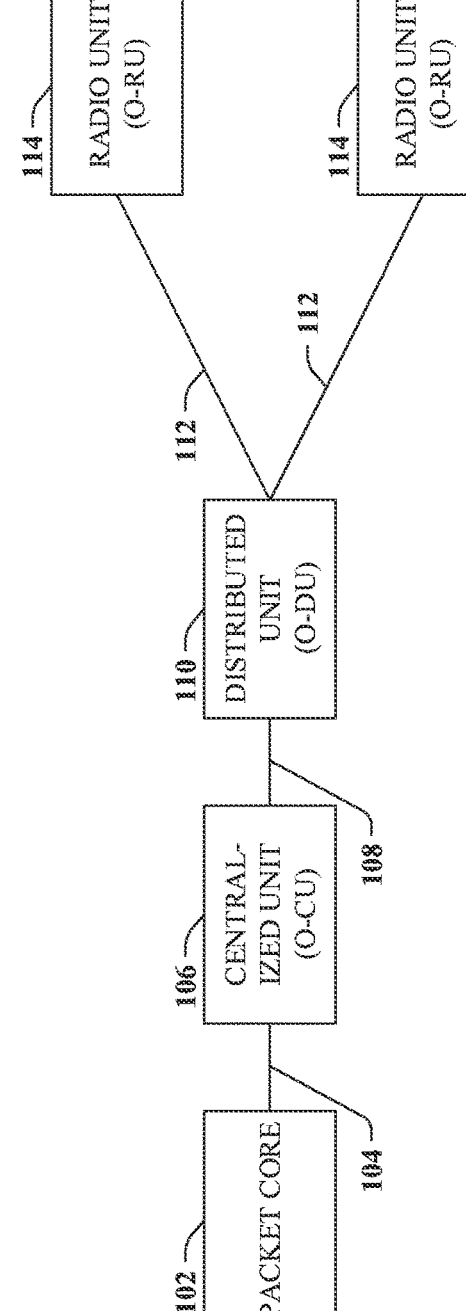
FIG. 1

400A

EXAMPLE COUNTERS 304 FOR 1 SLOT WITH NORMAL CYCLIC PREFIX

| COUNTERS 304 | 71 | 78 | 0 | 273 | 12 | 115 | 31 | 45 | 13 | 20 | 202 | 199 | 108 | 83 |
|---|---|---|---|---|---|---|---|---|---|---|---|---|---|---|
| SYMBOLS 305 | 1 | 2 | 3 | 4 | 5 | 6 | 7 | 8 | 9 | 10 | 11 | 12 | 13 | 14 |

EXAMPLE COUNTERS 304 FOR 1 SLOT WITH EXTENDED CYCLIC PREFIX

| COUNTERS 304 | 71 | 78 | 0 | 273 | 12 | 115 | 31 | 45 | 13 | 20 | 202 | 199 |
|---|---|---|---|---|---|---|---|---|---|---|---|---|
| SYMBOLS 305 | 1 | 2 | 3 | 4 | 5 | 6 | 7 | 8 | 9 | 10 | 11 | 12 |

| SCS (kHz) | Channel Bandwidth (MHz) | | | | | | | | | | | | |
|---|---|---|---|---|---|---|---|---|---|---|---|---|---|
| | 5 | 10 | 15 | 20 | 25 | 30 | 40 | 50 | 60 | 70 | 80 | 90 | 100 |
| | Total Number of PRBs | | | | | | | | | | | | |
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

| | 0 (msb) | 1 | 2 | 3 | 4 | 5 | 6 | 7 (lsb) | # of bytes | |
|---|---|---|---|---|---|---|---|---|---|---|
| Section Type 1: DL/UL control msgs | | | | | | | | | | |
| | transport header, see section 3.1.3 | | | | | | | | 8 | Octet 1 |
| | dataDirection | payloadVersion | | | | filterIndex | | | 1 | Octet 9 |
| | | | frameId | | | | | | 1 | Octet 10 |
| | subframeId | | | | slotId | | | | 1 | Octet 11 |
| | slotId | | startSymbolId | | | | | | 1 | Octet 12 |
| | numberOfSections | | | | | | | | 1 | Octet 13 |
| | sectionType = 1 | | | | | | | | 1 | Octet 14 |
| | udCompHdr | | | reserved | | | | | 1 | Octet 15 |
| | sectionId | | | | | | | startPrbc | 1 | Octet 16 |
| | startPrbc | | | | rb | symInc | | startPrbc | 1 | Octet 17 |
| | numPrbc | | | | | | | | 1 | Octet 18 |
| | reMask[11:4] | | | | | | | | 1 | Octet 19 |
| | reMask[3:0] | | | | beamId[11:8] | | | | 1 | Octet 20 |
| | beamId[7:0] | | | | | | | | 1 | Octet 21 |
| | ef | | | | numSymbol | | | | 1 | Octet 22 |
| | section extensions as indicated by "ef" | | | | | | | | var | Octet 23 |
| | | | | | | | | | | Octet 24 |
| | | | | | | | | | | Octet 25 |

FIG. 5

600

| 0 (msb) | 1 | 2 | 3 | 4 | 5 | 6 | 7 (lsb) | # of bytes | Octet |
|---|---|---|---|---|---|---|---|---|---|
| transport header, see section 3.1.3 | | | | | | | | 8 | Octet 1 |
| dataDirection | payloadVersion | | | filterIndex | | | | 1 | Octet 9 |
| frameId | | | | | | | | 1 | Octet 10 |
| subframeId | | | | slotId | | | | 1 | Octet 11 |
| slotId | | startSymbolid | | | | | | 1 | Octet 12 |
| numberOfsections | | | | | | | | 1 | Octet 13 |
| sectionType = 3 | | | | | | | | 1 | Octet 14 |
| timeOffset | | | | | | | | 2 | Octet 15 |
| frameStructure | | | | | | | | 1 | Octet 17 |
| cpLength | | | | | | | | 2 | Octet 18 |
| udCompHdr | | | | | | | | 1 | Octet 20 |
| sectionId | | | | | | | | 1 | Octet 21 |
| sectionId | | rb | symInc | startPrbc | | | | 1 | Octet 22 |
| startPrbc | | | | | | | | 1 | Octet 23 |
| numPrbc | | | | | | | | 1 | Octet 24 |
| reMask[11:4] | | | | | | | | 1 | Octet 25 |
| reMask[3:0] | | | | numSymbol | | | | 1 | Octet 26 |
| ef | beamId[14:8] | | | | | | | 1 | Octet 27 |
| beamId[7:0] | | | | | | | | 1 | Octet 28 |
| freqOffset | | | | | | | | 3 | Octet 29 |
| reserved (8 bits) | | | | | | | | 1 | Octet 32 |
| section extension as indicated by "ef" | | | | | | | | var | Octet 33 |

Section Type 3: PRACH & mixed-numerology

FIG. 6

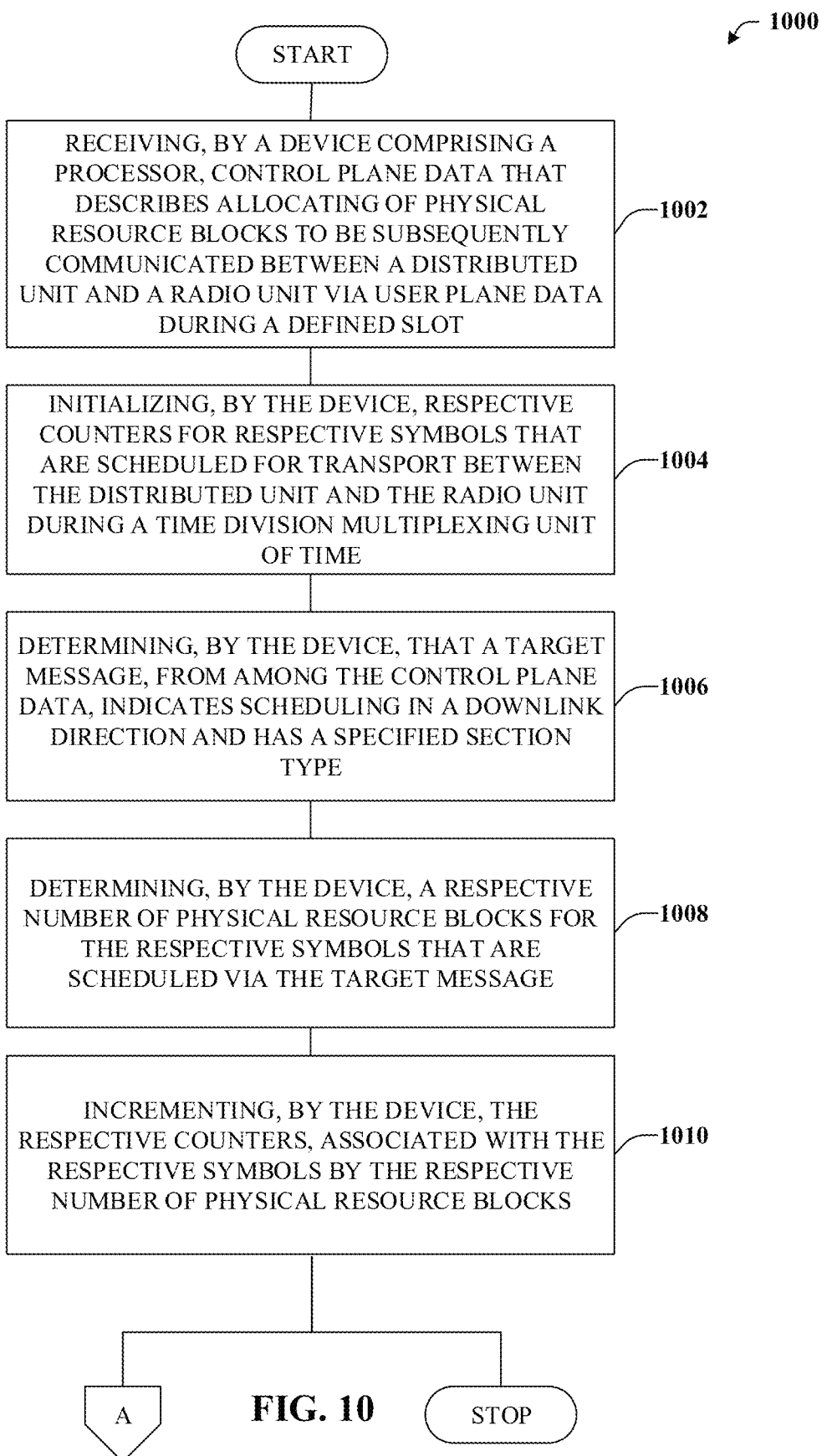

1000

START

RECEIVING, BY A DEVICE COMPRISING A PROCESSOR, CONTROL PLANE DATA THAT DESCRIBES ALLOCATING OF PHYSICAL RESOURCE BLOCKS TO BE SUBSEQUENTLY COMMUNICATED BETWEEN A DISTRIBUTED UNIT AND A RADIO UNIT VIA USER PLANE DATA DURING A DEFINED SLOT — 1002

INITIALIZING, BY THE DEVICE, RESPECTIVE COUNTERS FOR RESPECTIVE SYMBOLS THAT ARE SCHEDULED FOR TRANSPORT BETWEEN THE DISTRIBUTED UNIT AND THE RADIO UNIT DURING A TIME DIVISION MULTIPLEXING UNIT OF TIME — 1004

DETERMINING, BY THE DEVICE, THAT A TARGET MESSAGE, FROM AMONG THE CONTROL PLANE DATA, INDICATES SCHEDULING IN A DOWNLINK DIRECTION AND HAS A SPECIFIED SECTION TYPE — 1006

DETERMINING, BY THE DEVICE, A RESPECTIVE NUMBER OF PHYSICAL RESOURCE BLOCKS FOR THE RESPECTIVE SYMBOLS THAT ARE SCHEDULED VIA THE TARGET MESSAGE — 1008

INCREMENTING, BY THE DEVICE, THE RESPECTIVE COUNTERS, ASSOCIATED WITH THE RESPECTIVE SYMBOLS BY THE RESPECTIVE NUMBER OF PHYSICAL RESOURCE BLOCKS — 1010

STOP

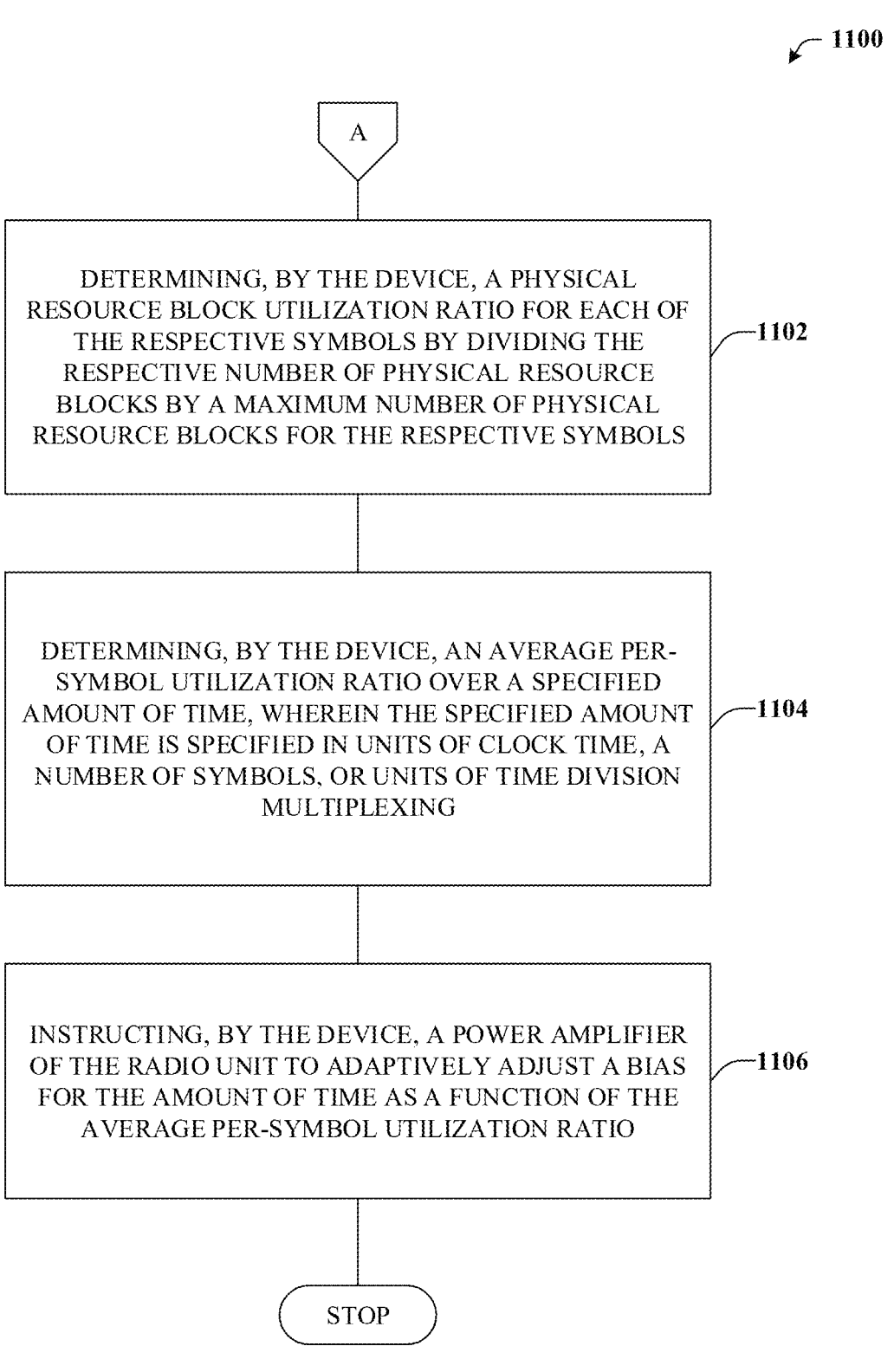

1100

A

DETERMINING, BY THE DEVICE, A PHYSICAL RESOURCE BLOCK UTILIZATION RATIO FOR EACH OF THE RESPECTIVE SYMBOLS BY DIVIDING THE RESPECTIVE NUMBER OF PHYSICAL RESOURCE BLOCKS BY A MAXIMUM NUMBER OF PHYSICAL RESOURCE BLOCKS FOR THE RESPECTIVE SYMBOLS — 1102

DETERMINING, BY THE DEVICE, AN AVERAGE PER-SYMBOL UTILIZATION RATIO OVER A SPECIFIED AMOUNT OF TIME, WHEREIN THE SPECIFIED AMOUNT OF TIME IS SPECIFIED IN UNITS OF CLOCK TIME, A NUMBER OF SYMBOLS, OR UNITS OF TIME DIVISION MULTIPLEXING — 1104

INSTRUCTING, BY THE DEVICE, A POWER AMPLIFIER OF THE RADIO UNIT TO ADAPTIVELY ADJUST A BIAS FOR THE AMOUNT OF TIME AS A FUNCTION OF THE AVERAGE PER-SYMBOL UTILIZATION RATIO — 1106

STOP

FIG. 11

DETERMINING RADIO UNIT DL PRB SCHEDULING ON A PER-SYMBOL BASIS

RELATED APPLICATION

The subject patent application is related by subject matter to, U.S. patent application Ser. No. 17/823,643, filed Aug. 31, 2022, and entitled "OPEN RAN RADIO UNIT POWER SAVING ON PER-SYMBOL BASIS," the entirety of which related application is hereby incorporated by reference herein.

BACKGROUND

The O-RAN Alliance defines the specifications for all Open RAN components and the interfaces between them. Founded in 2018, the O-RAN Alliance is a progressive, global community comprising mobile network operators, manufacturers, vendors, and research and academic organizations working in telecommunications spaces all over the world. Typically, Open RAN refers to the disaggregated radio access network with open interfaces between network components sourced from multiple suppliers.

Open RAN (also referred to as O-RAN) represents an ongoing shift in mobile network architectures that enables service providers the use of non-proprietary subcomponents from a variety of vendors. An Open RAN, or open radio access network, is made possible by a set of industry-wide standards that telecom suppliers can follow when producing related equipment. Open RAN enables programmable, intelligent, disaggregated, virtualized, and interoperable functions. Specifically, the proprietary remote radio head (RRH) and baseband units (BBUs) are now disaggregated to radio units (RUS), distributed units (DUs), and centralized units (CUs), many of which can be virtualized or containerized. The interfaces between these new components are open and interoperable. Hence, a service provider is not locked in to a single proprietary vendor for any given component, and all vendor-supplied components that are O-RAN compliant are able to communicate with any other O-RAN compliant component, regardless of the particular vendor.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which:

FIG. 1 illustrates a schematic block diagram illustrating an example disaggregated Open RAN in accordance with example embodiments of this disclosure;

FIG. 4A depicts an example diagram 400A illustrating a first example group of counters 304 for one slot with normal cyclic prefix in accordance with some example embodiments of this disclosure;

FIG. 4B depicts an example diagram 400B illustrating a second example group of counters 304 for one slot with extended cyclic prefix in accordance with some example embodiments of this disclosure;

FIG. 4C depicts an example diagram 400C illustrating a maximum number of PRBs that are permitted for each symbol 305 based on channel bandwidth and SCS in accordance with some example embodiments of this disclosure;

FIG. 5 illustrates an example diagram describing a structure of section type 1 messages in accordance with example embodiments of this disclosure;

FIG. 6 illustrates an example diagram describing a structure of section type 3 messages in accordance with example embodiments of this disclosure;

FIG. 10 illustrates an example method 1000 that can determine DL PRB scheduling and/or allocation on a per-symbol basis in accordance with some example embodiments of this disclosure;

FIG. 11 illustrates an example method 1100 that can provide for additional elements in connection with determining DL PRB scheduling and/or allocation on a per-symbol basis in accordance with some example embodiments of this disclosure;

DETAILED DESCRIPTION

Overview

Figure 2:
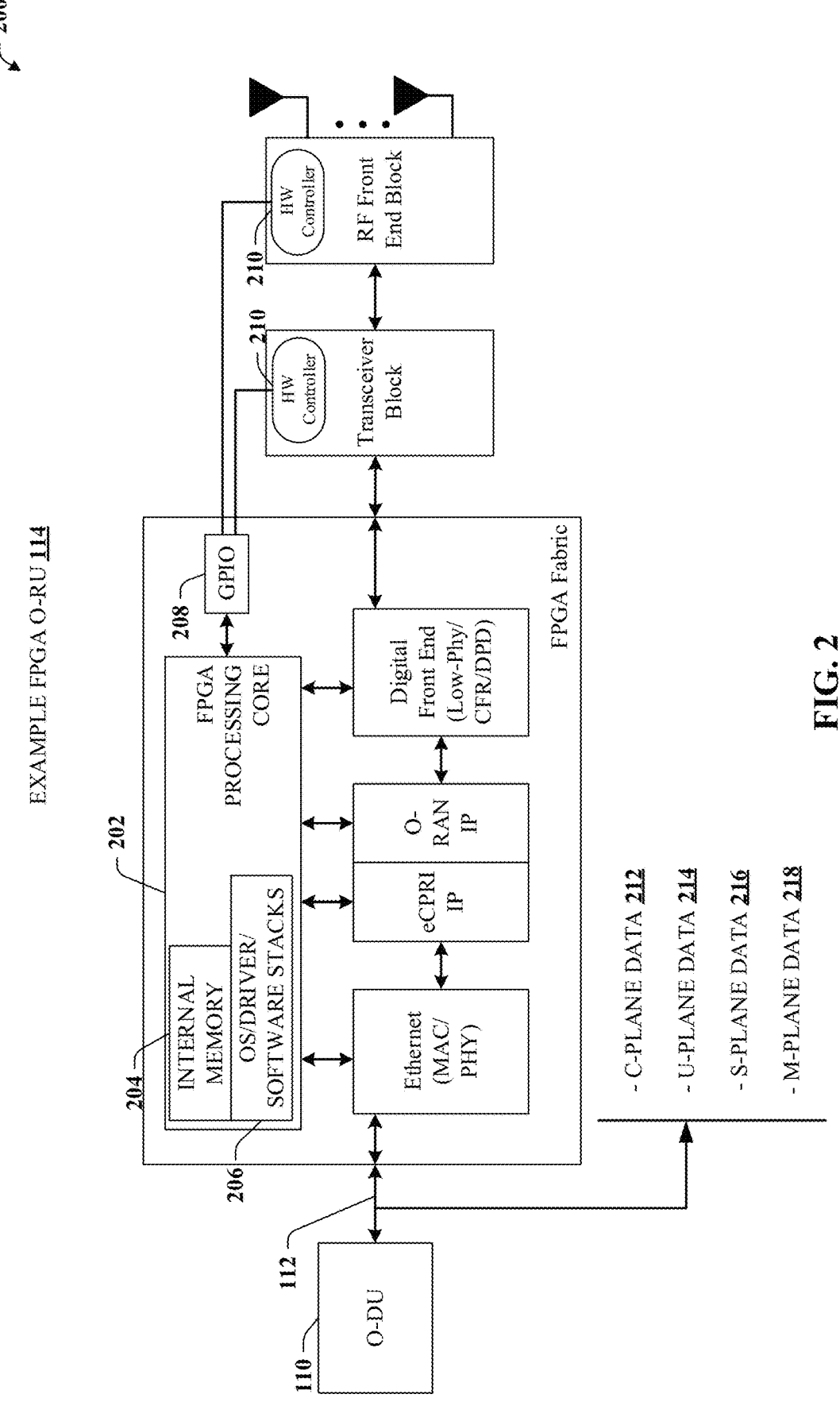
FIG. 2 depicts a schematic block diagram illustrating an example field programmable gate array (FPGA) O-RU architecture in accordance with example embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

The present application relates generally to determining, at a radio unit (O-RU), downlink (DL) physical resource block (PRB) scheduling on a per-symbol basis. While PRB scheduling information can be useful in a number of ways, in the context of an Open RAN (radio access network) this information is not specified in the standards to be provided to a radio unit (O-RU). Therefore, it can be advantageous for the O-RU to determine this information based solely on information that is communicated according to Open RAN specification and therefore remain vendor-agnostic.

In order to better understand the subject matter detailed herein, it can be instructive to consider an example Open RAN architecture. FIG. 1 depicts a schematic block diagram 100 that illustrates an example disaggregated Open RAN in accordance with some example embodiments of this disclosure. In this example, the Open RAN network comprises packet core 102 configured to communicate via backhaul 104 with one or more centralized unit (O-CU) 106. Typically, backhaul 104 transports data according to Internet protocol (IP).

O-CU 106 can communicate via open midhaul interface 108 with one or more distributed unit (O-DU) 110. Open midhaul interface 108 can communicate according to IP, but it is noted that because open midhaul interface 108 is an open standard, it is no longer expected that equipment comprising O-CU 106 and O-DU 110 communicate in a proprietary way or be from the same vendor.

In some embodiments, packet core 102, O-CU 106, or O-DU 110 can be virtualized and operate, respectively, as a virtual packet core 102, a virtual centralized unit (vCU) 106, or a virtual distributed unit (vDU) 110.

O-DU 110 can communicate via open fronthaul interface 112 with one or more radio unit (O-RU) 114. Open fronthaul interface 112 can communicate according to an enhanced common public radio interface (eCPRI) protocol or a radio-over-Ethernet (ROE) protocol.

It is noted that until Open RAN, the interfaces between conventional BBU and RRH were proprietary, meaning that only one vendor could provide both BBU and RRH equipment. Open RAN disaggregated this architecture and introduced open interfaces (e.g., open midhaul interface 108, open fronthaul interface 112, . . . ). Moreover, instead of relying on conventional RRH and BBU architectures, associated functions are disaggregated into elements depicted herein, namely, the radio unit (e.g., O-RU 114), the distributed unit (e.g., O-DU 110), and the centralized unit (e.g., O-CU 106) with open interfaces between them and with the potential that radio unit, distributed unit, or centralized unit functions can be virtualized or containerized.

One challenge that confronts modern networks, including Open RANs, is that the Open RAN standard does not provide a radio unit (e.g., O-RU 114) foreknowledge of PRB scheduling on a per-symbol basis. Because open fronthaul interface 112 operates according to an open standard, O-DU 110 and O-RU 114 can be from different vendors. While this represents a significant benefit to service providers, such also means that any interaction between O-DU 110 and O-RU 114 that is not part of the O-RAN specification cannot be presumed. Therefore, certain proprietary techniques relied upon may not be suitable for deployment in an Open RAN implementation, particularly techniques that relied upon computations performed upstream from the radio unit or extra commands or signals, since that particular component might be a different vendor that is not programmed to perform those computations or perform the computations in the same way or not programmed to send or receive the extra commands or signals.

To these and other related ends, the disclosed subject matter can determine downlink (DL) PRB scheduling for O-RU 114. DL PRB scheduling can be determined by the O-RU 114 itself without relying on any computations or intelligence assumed from another component of the Open RAN (e.g., O-DU 110, O-CU 106, . . . ), but rather relying (potentially entirely) on information that is available to O-RU 114 as part of ordinary Open RAN operation.

In particular, techniques detailed herein can enable an O-RU to determine DL PRB scheduling on a symbol-by-symbol basis by relying on information that already exists in control plane messages. For example, by determining DL PRB scheduling for each orthogonal frequency-division multiplexing (OFDM) symbol, a per-symbol PRB load can be determined, which is referred to herein as a utilization ratio or PRB utilization ratio (PUR).

Because control plane messages are communicated prior to associated user plane messages, there is a consistent time window (e.g., at least several slots) during which DL PRB scheduling can be determined at the O-RU and this information, as well as any other information derived there from (e.g., PUR over a given time), can be utilized by the O-RU to improve certain operations or functions, which cannot be accomplished if similar data was determined based on information included in user plane messages.

For instance, one advantage of using control plane messages versus user plane messages for the above-mentioned computations is that since the O-DU sends control plane messages several slots earlier than the actual I/Q data in the user plane, this time margin gives the O-RU a head start and enough time budge for planning and executing various energy-saving techniques or other beneficial operations that can be accomplished from the PRB scheduling information. Such operations or function may not otherwise be feasible to implement by relying on user plane I/Q data, because of a lack of time to perform the operations. In O-RAN operation, I/Q data has strict time margins which require short processing duration between reception of the data at the O-RU and when it has to be sent over the air from the radio antennas. Therefore, by deriving the DL PRB scheduling data from control plane messages, power-saving opportunities or other advantageous opportunities can be realized.

To provide a few examples, the DL PRB scheduling data can be used to derive PUR data on a per-symbol basis or average PUR data over a given time. In effect, such can represent traffic load information for each DL OFDM symbol in every slot in the form of PRB utilization ratios or percentages. In other words, the PUR data can indicate each symbol's PRB loading percentage with respect to a fully loaded PRB allocation, which can depend on the radio frequency (RF) channel bandwidth and subcarrier spacing (SCS) for each antenna carrier.

As noted, by identifying DL PRB scheduling information (and/or PUR data) on a per-symbol basis, such can enable O-RU 114 to employ different power efficiency enhancement techniques such as adaptively modifying a bias of an associated power amplifier in the DL RF chains for improved or optimal efficiency based on the varying nature of the incoming traffic. Such can reduce power consumption by the power amplifiers and boost overall O-RU energy efficiency as a result.

Furthermore, O-RU 114 can utilize the DL PRB scheduling data to determine the average PUR over any desired period of time, which can be any time division multiplexing (TDM) unit such as a slot, subframe, frame or the like or a clock unit such as 1 minute, 1 second, 1 millisecond, or the like. The average PUR can be used for various O-RU 114 calibration loop/function enhancements or optimizations, which can depend on the average incoming DL traffic load. Such can relate to, e.g., DL gain/temperature compensation loops, crest factor reduction (CFR) threshold determinations, or other suitable operations.

Such improvements, even for short periods of time, can result in significant power consumption reduction by an associated O-RU 114. Advantageously, said power saving opportunities can be identified by O-RU 114 for any communication over open fronthaul interface 112 that is Open RAN-compliant, regardless of whether or not O-RU 114 and O-DU 110 are from the same vendor.

Enhancement of O-RU 114 energy efficiency can be a key advantage and can be a significant market differentiator in Open RAN ecosystems where lower power consumption and energy cost savings represent an important consideration for RAN network operators worldwide. DL traffic information can be a key piece of information that can enable O-RU 114 to enhance energy efficiency by improving various radio operations according to the varying nature of incoming traffic.

FIG. 2 depicts a schematic block diagram 200 that illustrates an example O-RU 114 architecture in accordance with some example embodiments of this disclosure. It is appreciated that O-RU 114 can be any suitable device or circuit that is capable of being Open RAN compliant. Non-limiting examples include a field programmable gate array (FPGA) device, an application-specific integrated circuit (ASIC), a microcontroller and so. In this particular example, O-RU 114 is implemented as a FPGA, though it is understood such is not intended to be limiting, but rather to provide one concrete example in the context of the disclosed subject matter.

O-RU 114 can be configured to communicate, for example, via open fronthaul interface 112, with O-DU 110, which can be any suitable distributed unit that is Open RAN-compliant. Open RAN specifications define four different communication planes over open fronthaul interface 112, namely a control plane (C-plane), a user plane (U-plane), a synchronization plane (S-plane), and a management plane (M-plane). The control plane is used for communication of C-plane data 212, which is generally related to control plane messages that define the scheduling and coordination utilized for data transfer, beam forming, or the like. The user plane is used for communication of U-plane data 214, which is generally related to user plane message for efficient data transfer within the strict time limits of related communication specifications such as 5G numerologies. The synchronization plane is used for communication of S-plane data 216, which is generally responsible for timing and synchronization parameters between the O-DU 110 and the O-RU 114. The management plane is used for communication of M-plane data 218, which is used to manage the O-RU 114.

O-RU 114 can comprise a processor and a memory, in this case respectively illustrated as FPGA processing core 202 and internal memory 204. Internal memory 204 can comprise data 206 relating to operating system data, driver data, software stack data, and so forth. As noted previously, an objective of the disclosed techniques is to determine DL PRB scheduling. Information relating to DL PRB scheduling (e.g., in the form of counters that track a number of PRBs scheduled or allocated to a particular symbol) can be generated by FPGA processing core 202 and potentially stored to internal memory 204. Based on these counters (or other suitable identification of PRB scheduling), various devices (e.g., power amplifiers) can be instructed to modify a bias or otherwise reconfigure based on the dynamic patterns of incoming traffic. Such can be effectuated via general purpose input/output (GPIO) 208 that facilitates instructions to, e.g., a hardware controller 210 to power down/up associated devices or equipment according to PRB scheduling.

Open RAN-compliant devices typically communicate via orthogonal frequency-division multiplexing (OFDM) protocols or techniques in which OFDM symbols are communicated between the two devices, generally via U-plane data 214. However, prior to such communication, PRBs can be scheduled or allocated to a given symbol via C-plane data 212 that is required by Open RAN specification for processing of U-plane data 214.

Techniques detailed herein can utilize existing control plane message (e.g., C-plane data 212) sent from O-DU 110 to O-RU 114 over open fronthaul interface 112. Such C-plane data 212 can be examined to determine DL PRB scheduling for each slot, subframe, radio frame, antenna, and so forth. Such can be accomplished by initializing a counter for each symbol. For example, individual counters (e.g., each corresponding to an associated symbol) can be grouped together to represent any duration, including for one or more slots, one or more subframes, one or more radio frames and so forth. Counters related to different slots (or other duration) can be combined with other counters to form a longer duration (e.g., several slot counters can be combined to form a subframe counter). Implementation of such can be based on available storage space of internal memory 204.

Example DL PRB Scheduling Systems

Figure 3:
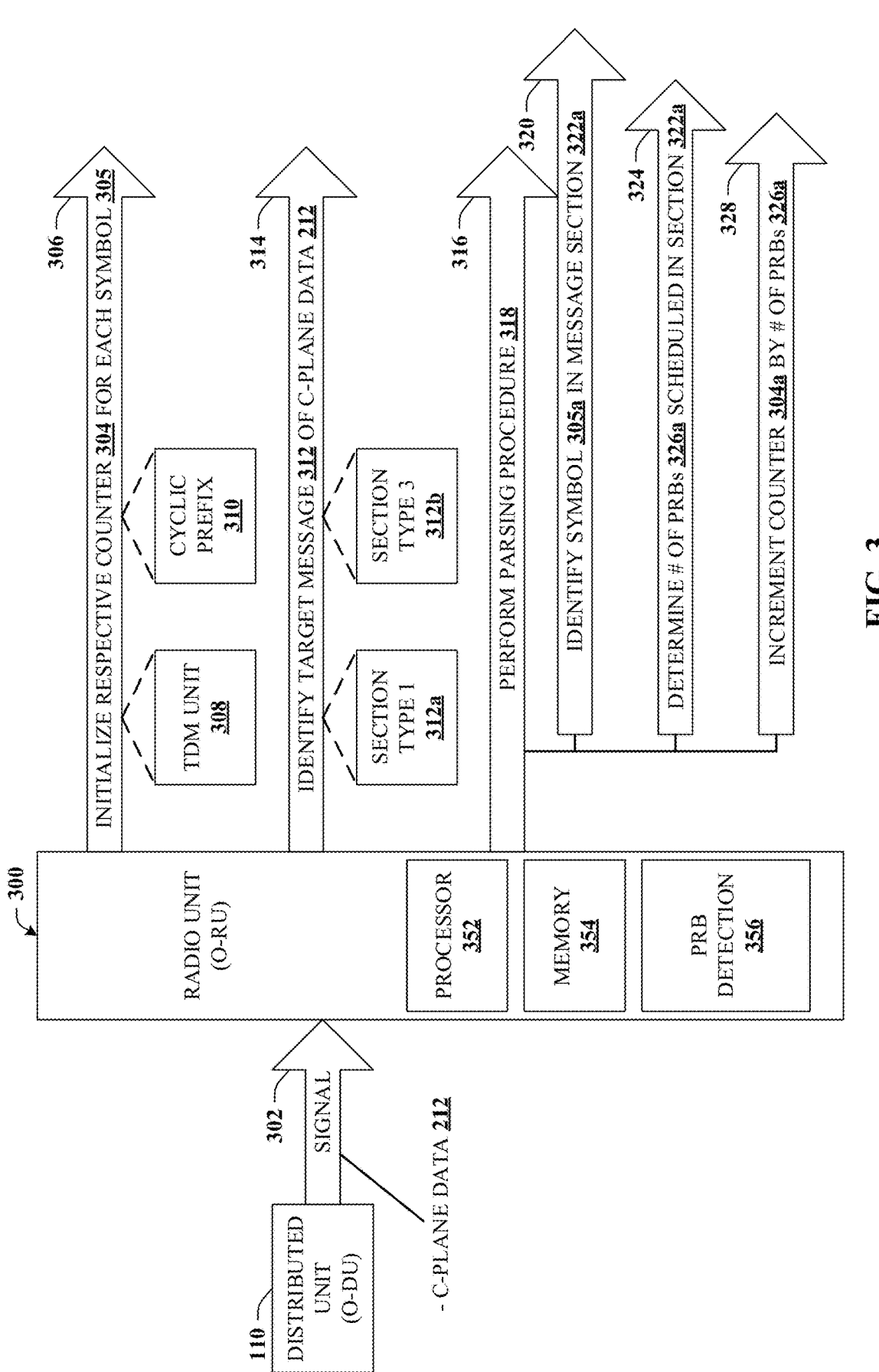
FIG. 3 depicts a schematic block diagram is depicted illustrating an example O-RU 300 that can determine DL PRB scheduling and/or allocation on a per-symbol basis in accordance with some example embodiments of this disclosure.

Referring now to FIG. 3, a schematic block diagram is depicted illustrating an example O-RU 300 that can determine DL PRB scheduling and/or allocation on a per-symbol basis in accordance with some example embodiments of this disclosure. Device 300 can comprise a processor 352 that can be specifically configured to determine DL PRB scheduling in accordance with PRB Dection 356. Device 300 can also comprise memory 354 that stores executable instructions that, when executed by processor 352, can facilitate performance of operations. Processor 352 can be a hardware processor having structural elements known to exist in connection with processing units or circuits, with various operations of processor 352 being represented by functional elements shown in the drawings herein that can require special-purpose instructions, for example, stored in memory 354 and/or a PRB detection 356 component or circuit. Along with these special-purpose instructions, processor 352 and/ or device 300 can be a special-purpose device. One non-limiting example of processor 352 and memory 354 can be FPGA processing core 202 and internal memory 204 of FIG. 2. Further examples of memory 354 and processor 352 can be found with reference to FIG. 12. It is to be appreciated that device 300 or computer 1202 can represent a network device, a client device, or other device that can be used in connection with implementing one or more of the systems, devices, or components shown and described in connection with FIG. 3 and other figures disclosed herein.

O-RU 300 can be configured to receive signal 302. Signal 302 can be formatted according to an open radio access network (Open RAN) standard or specification. Signal 302 can comprise at least C-plane data 212. C-plane data 212 can comprise various control messages that, inter alia, relate to scheduling of OFDM symbols 305 with respect to subsequent U-plane 314 signals or messages.

It is noted that each OFDM symbol 305 can consist of several PRBs depending on the channel bandwidth and subcarrier spacing that is employed. For example, an OFDM symbol 305 with 100 megaHertz (MHz) of bandwidth and subcarriers spacing of 30 kiloHertz (kHz) has 273 PRBs in total, which is used herein as a representative example, though non-limiting example. However, as shown in diagram 400C of FIG. 4C, the total or maximum number of PRBs for a given OFDM symbol can vary depending on the channel bandwidth and the subcarrier spacing (SCS).

The full PRB allocation scheme for a particular symbol can depend on a number of parameters, including, for example, how O-DU 110 schedules different users by assigning different time and frequency resources to each user (e.g., each O-RU 114 that is served by O-DU 110). Another example parameter can be the location of control and reference signals in a time-frequency grid.

C-plane data 212 generally carry data-associated control information from O-DU 110 to O-RU 114, which is required for subsequently processing U-plane data at O-RU 114. This data-associated control information can include, e.g., scheduling and PRB allocations.

However, C-plane message granularity is not necessarily based on a symbol-by-symbol definition. Rather, the information utilized to identify different resource elements inside a particular PRB to construct an associated OFDM symbol 305 can be described by different sections of a given C-plane message, as well as by many different C-plane messages. In other words, C-plane messages can describe PRB allocations for many different symbols that are scattered all over the time-frequency grid over the duration of a slot (or other duration). Hence, for O-RU 114, determining DL PRB scheduling or allocation is not a trivial determination, due at least in part to the arrangement of PRB allocations within typical C-plane messages.

In that regard, O-RU 114 can initialize respective counters 304. For example, each respective counter 304 can be configured with a respective symbol 305 that is scheduled for transport between O-DU 110 and O-RU 114 during a given time division multiplexing (TDM) unit 308 of time (e.g., a slot, subframe, radio frame, . . . ). Because the number of symbols 305 can depend on numerous factors, by proxy, the number of counters 304 can also depend on those factors. Examples can include the TDM unit 308 being observed (e.g., a slot, a subframe, a full radio frame, or the like) and cyclic prefix 310. Additional detail relating to cyclic prefix 310 is provided in connection with FIGS. 4A and 4B.

While still referring to FIG. 3, but turning now as well to FIGS. 4A and 4B, two example groups of counters 304 are depicted. In that regard, diagram 400A illustrates a first example group of counters 304 for one slot with normal cyclic prefix in accordance with some example embodiments of this disclosure. Diagram 400B illustrates a second example group of counters 304 for one slot with extended cyclic prefix in accordance with some example embodiments of this disclosure. Since each counter 304 can be implemented to aggregate the number of PRBs scheduled for an associated symbol 305, the number of counters 304 can match the number of symbols 305.

Thus, for a single slot with normal cyclic prefix, 14 symbols can be transported. As such, the associated group counter 304 can be generated or initialized in that case with 14 counters 304, as illustrated by diagram 400A. In contrast, for a single slot with extended cyclic prefix, 12 symbols can be transported. Hence, the group of counters 304, in that case can be generated or initialized with 12 distinct counters 304, as illustrated by diagram 400B, each being related to a specific one of the 12 different symbols 305. Therefore, the value listed for each of the respective counters 304 can indicate the number of PRB's that are scheduled or allocated for an associated symbol 305.

While both of these examples relate to a single slot, other durations 308 are possible. For example, if a subframe comprises two slots is considered, then the group of counters 304 for that subframe (as opposed to a single slot) can have 28 different counters 304 in the case of normal cyclic prefix or 24 counters 304 in the case of extended cyclic prefix.

Referring to FIG. 4C, as introduced above, diagram 400C illustrates a maximum number of PRBs that are permitted for each symbol 305 based on channel bandwidth and SCS in accordance with some example embodiments of this disclosure.

Thus, as in the representative example in which the channel bandwidth is 100 MHz and the SCS is 30 kHz, a total or maximum of 273 PRBs can be transported for each symbol 305. Hence, with regard to FIGS. 4A and 4B, it is noteworthy to point out that the third symbol 305 has no PRBs at all scheduled (e.g., the number of PRBs scheduled is zero according to the associated counter 304). In contrast, the fourth symbol 305 has 273 PRBs schedule for transport, so the associated symbol has the maximum PRB load possible.

Still referring to FIG. 3, once respective counters 304 have been initialized (e.g., an associated data structure is created or an associated value is set to zero or another starting value), a given counter 304 can be ready for PRB counting for an associated symbol 305. Such can be accomplished by parsing certain target messages 312 of C-plane data 212.

In that regard, C-plane data 212 can comprise many C-plane messages that use a common frame format consisting of a transport layer and an application layer. The application layer can consist of a common header followed by parameters specific to a C-plane 'section type' that is being used. A 'section type' defines the characteristics of U-plane data to be transmitted or received from a beam with one pattern ID within the application common header. According to Open RAN specifications, there are currently several section types being used, out of a possible 256 section types that can be supported.

However, based on current implementations, only two section types are (currently) relevant to the techniques disclosed herein, namely, C-plane messages of section type 1 or C-plane messages of section type 3. Messages of section type 1 are used for downlink and uplink radio channels. FIG. 5 illustrates diagram 500 describing a structure of section type 1 messages in accordance with some example embodiments of this disclosure. Messages of section type 3 are used for PRACH and mixed-numerology channels. FIG. 6 illustrates diagram 600 describing a structure of section type 3 messages in accordance with some example embodiments of this disclosure.

Still referring to FIG. 3, at reference numeral 314, device 300 can identify target message 312 based on a first determination that the associated C-plane 212 message is scheduled in a DL direction. For example, in some embodiments, messages that provide scheduling in an uplink (UL) direction can be ignored. Device 300 can further identify target message 312 based on a second determination that the associated C-plane 212 message is of section type 1 (e.g., message 312*a*) or section type 3 (e.g., message 312*b*). The above section types (e.g., section type 1 and section type 3) are mandatory section types in C-plane messages and are required to be supported by any Open RAN compliant O-DU 110. Thus, these messages 312*a* and/or 312*b* are guaranteed to exist for any Open RAN compliant system regardless of vendor. Furthermore, based on current Open RAN specifications, all dynamic scheduling and PRB allocation information is communicated to O-RU 300 in C-plane messages via these two section types 312*a*. 312*b*, from O-DU 110.

Hence, in order to determine DL PRB scheduling, device 300 can, in some embodiments, limit examination of C-plane 212 messages to examining only a subset of C-plane 212 messages comprising only those C-plane 212 messages that are of section type 1 or section type 3 and that are scheduled in a DL direction. This subset is referred to herein as target message(s) 312, which can be identified by O-RU 300, as illustrated at reference numeral 314. In other words, target message(s) 312 can consist of only messages of section type 1 (e.g., target message 312*a*) or messages of section type 3 (e.g., target message 312*b*) and exclude other messages, e.g., messages of any other section types.

However, it is understood that future changes to Open RAN specifications such as the introduction of additional section types, can result in changes to the current implementation. For example, future changes to Open RAN specifications may result in interest in other section types, other than section type 1 and section type 3, without departing from the scope or spirit of the disclosed techniques. Therefore, in some embodiments, target message(s) 312 can include other section types in addition to, or instead of, section types 1 or 3.

As illustrated at reference numeral 316, O-RU 300 can perform parsing procedure 318. Parsing procedure 318 can parse one or more target messages 312 included in C-plane data 212, which is further detailed according to some embodiments in connection with FIG. 8. Parsing procedure 318 can comprise all or a portion of elements indicated by reference numerals 320, 324, and 328 as well as other elements indicated herein.

For example, at reference numeral 320, device 300 (e.g., as part of parsing procedure 318) can identify symbol 305*a* that is indicated by a message section 322*a* of target message 312. Symbol 305*a* can be any symbol from among the symbols 305 that are scheduled for transport and for which an associated counter (e.g., counter 304*a*) is initialized. It is noted that not all message sections 322 of a given target message 312 will refer to all symbols 304. Rather, information about symbols 304 can be dispersed throughout many target messages 312 and within different message sections 322 of any given target message 312. However, by parsing target messages 312 over a given time period (e.g., TDM unit 308), information about symbols 304 can be obtained, which is further detailed in connection with FIG. 7.

At reference numeral 324, device 300 can determine a number of PRBs 326*a* that are scheduled for the specific symbol 305*a* in message section 322*a*. At reference numeral 328, device 300 can increment counter 305*a* by the number of PRB's determined at reference numeral 324. Provided additional symbols 305 (e.g., in addition to symbol 305*a*) are referred to in message section 322*a*, those additional symbols can be processed in a like manner. It is understood that other message sections 322 of target message 312 as well as other target messages 312 may also indicate scheduling for symbol 305*a* or other symbols 305, which is further noted in connection with FIG. 7.

Figure 7:
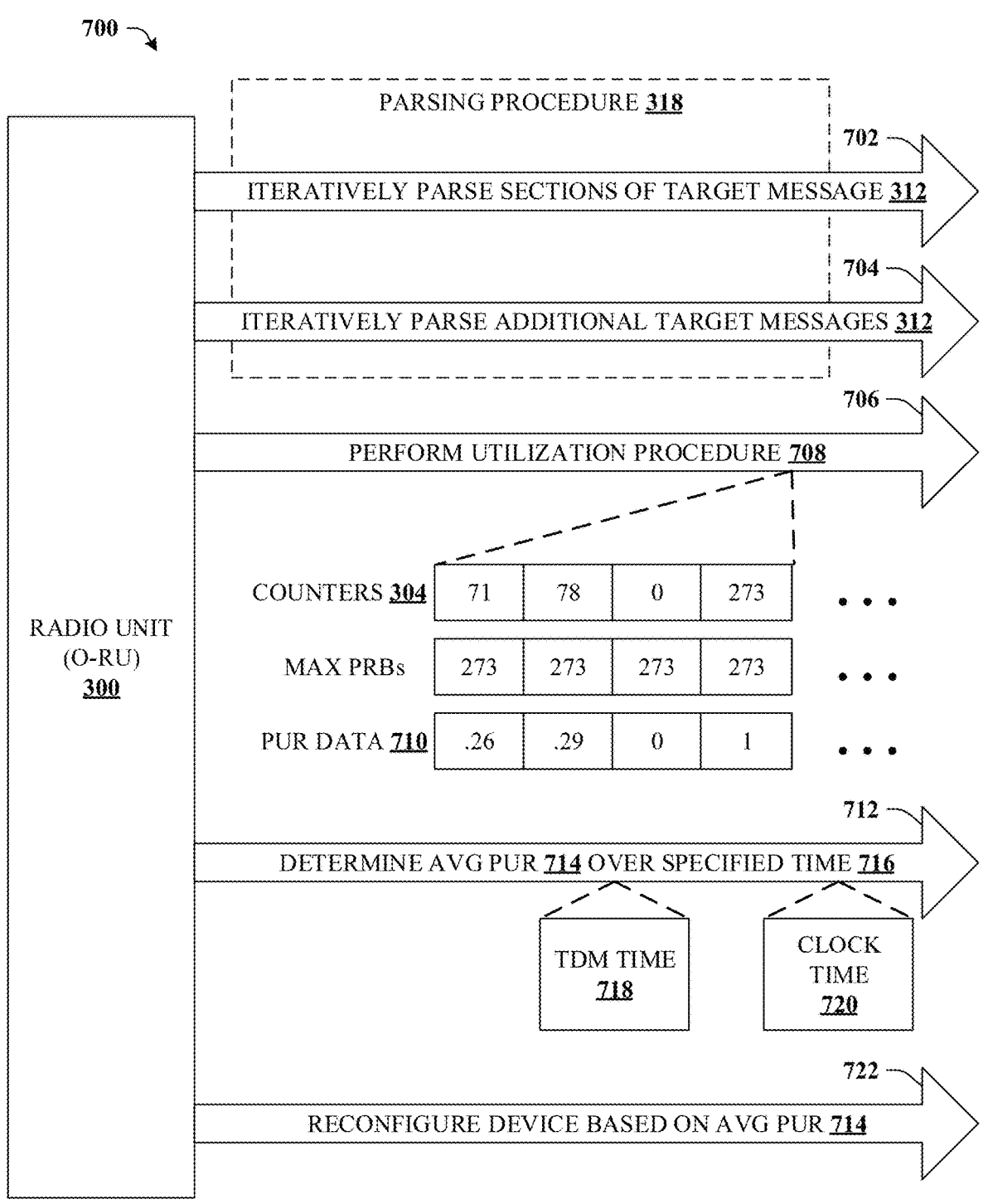
FIG. 7 depicts a schematic block diagram 700 illustrating additional aspects or elements of device (e.g., O-RU) 300 that can determine DL PRB scheduling and/or allocation on a per-symbol basis in accordance with some example embodiments of this disclosure.

Turning now to FIG. 7, a schematic block diagram 700 is depicted illustrating additional aspects or elements of device (e.g., O-RU) 300 that can determine DL PRB scheduling and/or allocation on a per-symbol basis in accordance with some example embodiments of this disclosure. For example, potentially as part of parsing procedure 318, device 300 can iteratively parse other message sections 322 of target message 312, as indicated at reference numeral 702 and can iteratively parse other target messages 312. For each symbol 305 that is identified in a given message section 322 of a given target message 312, the number, if any, of PRBs scheduled for transport can be incremented for the associated counter 304.

Once this or similar parsing is completed over a specified time 716, at reference numeral 706, device 300 can perform utilization procedure 708. It is noted that since target messages 312 are part of C-plane data 212, there will typically be a window of time before associated U-plane data 214 must be transported. Within this window, advantageous activities can take place that can reduce power consumption or otherwise allow O-RU 300 to operate more efficiently or more productively.

One such advantageous activity that can occur during the aforementioned time window (e.g., after C-plane data 212 has arrived but before associated U-plane data 214 is communicated) is utilization procedure 708. Utilization procedure 708 can determine a PRB utilization ratio (PUR) on a per-symbol basis.

As illustrated, once parsing procedure 318 has gathered sufficient information to populate counters 304, the values of each counter 304 can be compared (e.g., divided by) the maximum or total possible PRBs per symbol. The maximum number of PRBs can be read from an o-ran-uplane-conf.y-ang module stored at O-RU 300 or can be otherwise determined such as, for example, from a table similar to diagram 400C of FIG. 4C. In the current example, channel bandwidth is 100 MHZ and SCS is 30 kHz, so the maximum number of PRBs per symbol is 273. Thus, in some embodiments, the values of each respective counter 304 can be divided by 273, resulting in PUR data 710 indicative of per-symbol utilization ratios that can range from 0 (e.g., no PRBs scheduled) to 1 (e.g., all 273 PRBs are scheduled). In some embodiments, PUR data 710 can be multiplied by 100 to yield a per-symbol utilization percentage.

In the above example, only four symbols are shown, but it is appreciated that these techniques can be applied for any suitable number of symbols. As indicated at reference numeral 712, an average PUR 714 can be determined over any suitable specified time 716. The specified time can be TDM time 718 (e.g., a number of slots, subframes, radio frames, or the like) or a clock time 720 (e.g., millisecond, microsecond, . . . ), or even a defined number of symbols 304.

Furthermore, at reference numeral 722, O-RU 300 can reconfigure an associated element or device based on average PUR 714. For example, O-RU 300 can instruct an associated power amplifier to adaptively adjust a bias for the specified time 716 as a function of the average PUR 714. For instance, if the average PUR 714 is relatively low, the bias can be reduced over specified time 716, whereas if the average PUR 714 is relatively high, the bias can be increased for the specified time 716 to match corresponding PRB transport. As noted previously, the average PUR 714 can be used for various O-RU 300 calibration loop/function enhancements or optimizations, which can depend on the average incoming DL traffic load. Such can relate to, e.g., DL gain/temperature compensation loops, crest factor reduction (CFR) threshold determinations, or other suitable operations.

Example Methods

FIGS. 8-11 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Figure 8:
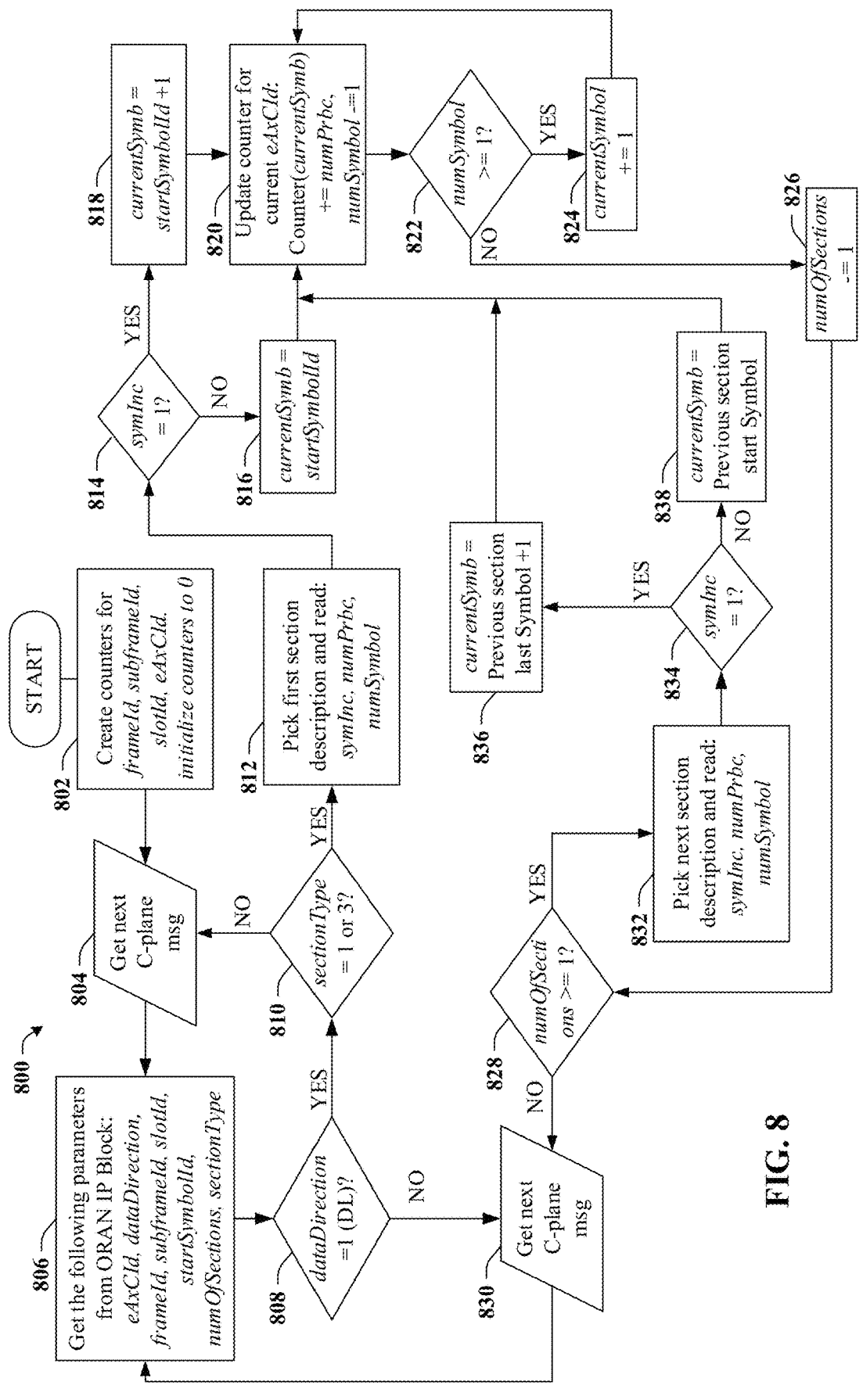
FIG. 8 illustrates an example method 800 that can parse control plane messages to determine DL PRB scheduling on a per-symbol basis in accordance with some example embodiments of this disclosure.

Turning now to FIG. 8, exemplary method 800 is depicted. Method 800 can parse control plane messages to determine DL PRB scheduling on a per-symbol basis in accordance with some example embodiments of this disclosure. At process block 802, a device comprising a processor can create or initialize counters for one or more of frameId, subframeId, slotId, or eAxCId elements defined by Open RAN specification, such as those for control plane messages. As noted previously, examples of control plane messages of section types 1 and 3 are provided at FIGS. 5 and 6, respectively. Initially, all counters can be set to zero or some other suitable value.

At data block 804, the device can identify the next control plane message. From that message, the device can obtain various parameters from the Open RAN IP block, as indicated at process block 806. The parameters can define by the Open RAN specification and can include eAxCId, dataDirection, frameId, subframeId, slotId, startSymbolId, numOfSections, and sectionType.

At decision block 808, the device can determine whether the dataDirection parameter equals "1", indicating that the scheduling is for the DL direction. If no, the current message can be ignored and the method can proceed to data block 830, where the next control plane message is selected. Otherwise, if yes, then the method can proceed to decision block 810.

At decision block 810, the device can determine wither the sectionType parameter equals either "1" or "3", indicating that the current control plane message is of section type 1 or 3. If no, the current message can be ignored and the method can proceed to data block 804, where the next control plane message is selected. It is noted that when proceeding to data blocks 804 or 830, if there are no further messages, the method can end. Otherwise, if the sectionType parameter equals "1" or "3", then the method can proceed to process block 812.

At process block 812, the device can select a specific message section of the target message and read values for symInc, numPrbc, and numSymbol. At decision block 814, the device can determine whether symInc="1". If not, method 800 can proceed to process block 816 where currentSymb can be set to equal startSymbolId of the current message section. Otherwise, if yes, method 800 can proceed to process block 818 where currentSymb can be set to equal startSymbolId+1 in order to keep track of the current symbol being processed and therefore the correct counter to update. In either case, method 800 can then proceed to process block 820.

At process block 820, a counter for the current eAxCId can be updated. For example, the counter associated with the symbol that is indicated by currentSymb can be incremented by the value of numPrbc that was read at process block 812. Thereafter, the value of numSymbol can be decremented by one and method 800 can proceed to decision block 822.

At decision block 822, the device can determine whether numSymbol is greater than or equal to one. If so, method 800 can proceed to process block 824 in which a value of currentSymbol can be incremented by one and then loop back to process block 820. Otherwise, if numSymbol is not greater than or equal to one, method 800 can proceed to process block 826, where the numOfSection that was read at process block 806 can be decremented by one.

At decision block 828, the device can determine whether numOfSections is greater than or equal to one. If not, such can indicate that there are no more message section for the target message. Therefore, method 800 can proceed to data block 830 to select the next message, if any, and repeat parsing in a similar fashion for the next message. Otherwise, if the determination at decision block 828 is yes, then the next message section of the target message can be selected and from the next message section, symInc, numPrbc, and numSymbol can be read.

At decision block 834, the device can determine whether symInc equals one. Regardless of the determination at decision block 834, method 800 can eventually loop back to process block 820. However, if the decision is yes, then method 800 can first traverse process block 836, whereas if the decision is no, then method 800 can first traverse process block 838.

At process block 836, a value of currentSymb can be set to the previous section's last symbol plus one. Otherwise, at process block 838, the value of currentSymb can be set to the previous section's start symbol.

In some embodiments, once all or a sufficient portion of target messages (e.g., target messages 312) are parsed and/or processed, the values of the counters (e.g., respective counters 304) can be populated with the number of PRBs (e.g., respective number of PRBs 326) that are scheduled for each respective symbol 305, a utilization procedure (e.g., utilization procedure 708) can be performed, which is further detailed in connection with FIG. 9.

Figure 9:
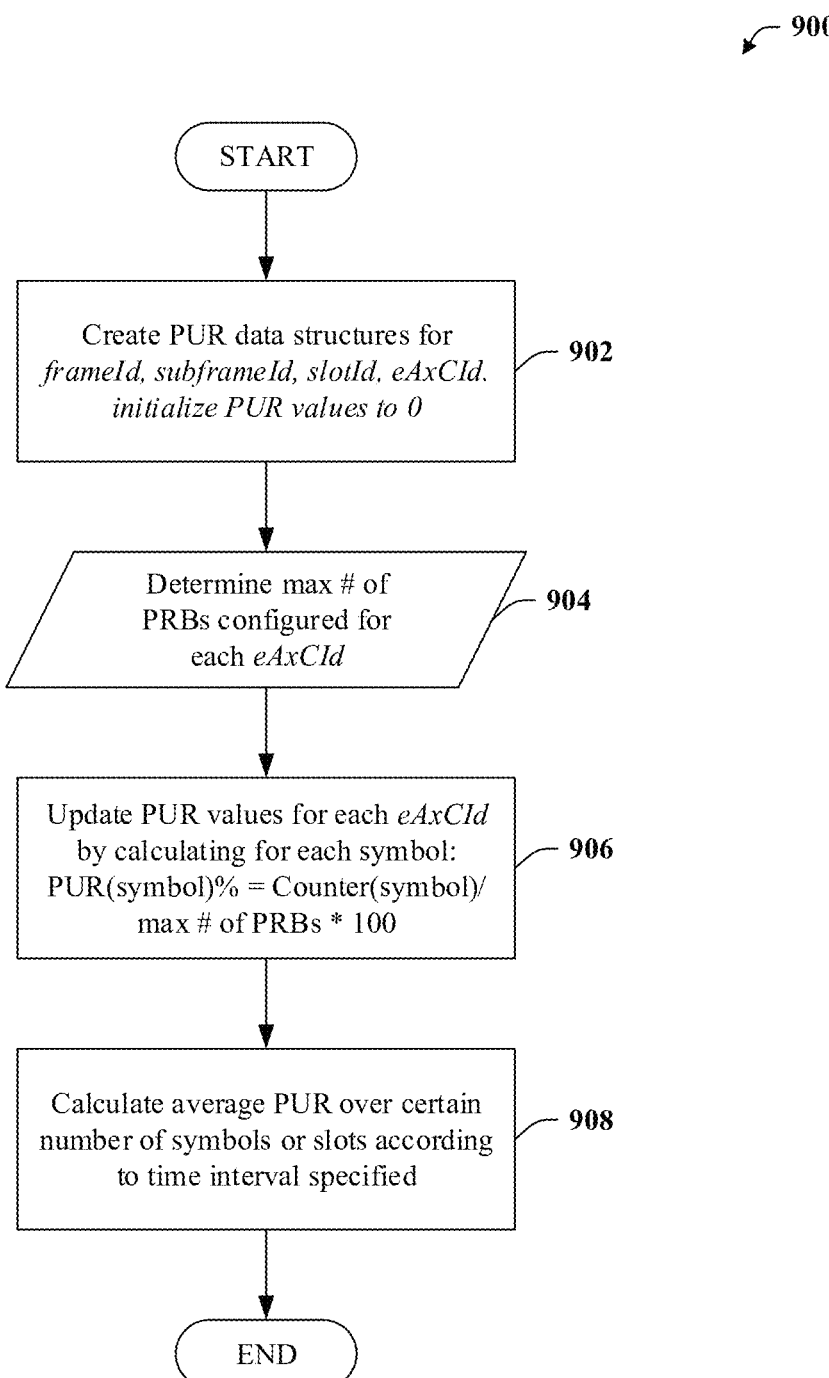
FIG. 9 illustrates an example method 900 that can determine PRB utilization ratios or percentages on a per-symbol basis in accordance with some example embodiments of this disclosure.

Turning now to FIG. 9, exemplary method 900 is depicted. Method 900 can determine PRB utilization ratios or percentages on a per-symbol basis in accordance with some example embodiments of this disclosure.

At process block 902, the device can create PRB utilization ratio (PUR) data structures for frameId, subframeId, slotId, eAxCId. In some embodiments, the PUR data structures can be initialized to zero. Method 900 can then proceed to data block 904.

At data block 904, the device can determine a maximum number of PRBs configured for each eAxCId. For example, such can be read at data block 904 from o-ran-uplane-conf.yang that is stored at the O-RU. As another example, such can be read from a table such as diagram 400C of FIG. 4C. Method 900 can then proceed to process block 906.

At process block 906, the device can update PUR data structure values for each eAxCId. Such can be accomplished by, e.g., calculating for each symbol (e.g., each symbol 305), the respective counter 304 value divided by the maximum number of PRBs that was determined at data block 904. Results can represent a per-symbol utilization ratio and can be placed in the PUR data structure. In some embodiments, the ratios can be multiplied by 100 to yield a per-symbol utilization percentage. Method 900 can then proceed to process block 908.

At process block 908, the device can calculate an average PUR over a defined time interval. The time interval can be a certain number of symbols, a certain number of slots, a certain amount of proper time or some other suitable interval. Thereafter, method 900 can end.

Referring now to FIG. 10, exemplary method 1000 is depicted. Method 1000 can determine DL PRB scheduling and/or allocation on a per-symbol basis in accordance with some example embodiments of this disclosure. While method 1000 describes a complete method, in some embodiments, method 1000 can include one or more elements of method 1100, as illustrated by insert A.

At reference numeral 1002, a device comprising a processor can receive control plane data. The control plane data can describe allocation of physical resource blocks to be subsequently communicated between a distributed unit and a radio unit via user plane data.

At reference numeral 1004, the device can initialize respective counters for respective symbols that are scheduled for transport between the distributed unit and the radio unit during a time division multiplexing unit of time. For example, assuming normal cyclic prefix, fourteen counters can be initialized per slot, since fourteen OFDM symbols are transported per slot.

At reference numeral 1006, the device can determine that a target message, from the control plane data received at reference numeral 1002, indicates scheduling in a downlink direction and has a specified section type. In other words, target messages (e.g., messages to be parsed) can be identified by satisfaction of certain criteria, in this case that the message be for the DL direction and that the message be of section type 1 or 3.

At reference numeral 1008, the device can determine a respective number of physical resource blocks for the respective symbols that are scheduled via the target message. Such can be accomplished via a parsing procedure that parses each appropriate message and each appropriate message section of a given target message.

At reference numeral 1010, the device can increment the respective counters, associated with the respective symbols, by the respective number of physical resource blocks identified during the parsing. Method 1000 can terminate or continue to insert A, which is further detailed in connection with FIG. 11.

Turning now to FIG. 11, exemplary method 1100 is depicted. Method 1100 can provide for additional elements in connection with determining DL PRB scheduling and/or allocation on a per-symbol basis in accordance with some example embodiments of this disclosure.

At reference numeral 1102, the device introduced at reference numeral 1002 comprising a processor can determine a physical resource block utilization ratio for each of the respective symbols. This PRB utilization ratio can be determined by dividing the respective number of physical resource blocks by a maximum number of physical resource blocks for the respective symbols.

At reference numeral 1104, the device can determine an average per-symbol utilization ratio over a specified amount of time. In some embodiments, the specified amount of time can be specified in units of clock time, a number of symbols, or units of time division multiplexing.

At reference numeral 1106, the device can instruct a power amplifier of the radio unit to adaptively adjust a bias for the amount of time as a function of the average per-symbol utilization ratio. For example, if the average per-symbol utilization ration is relatively low, then the bias can be decreased and vice versa.

Example Operating Environments

Figure 12:
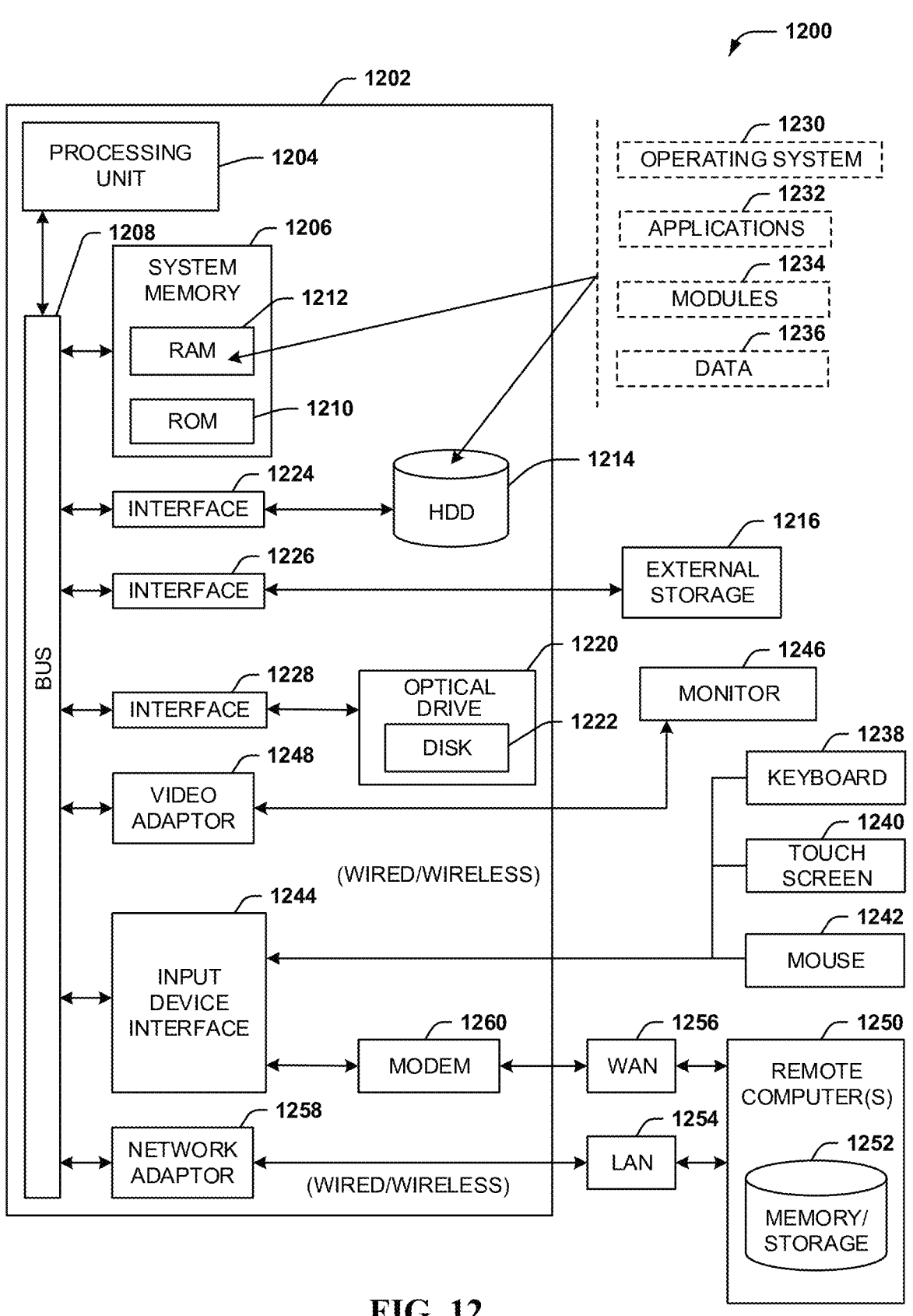
FIG. 12 illustrates an example block diagram of a computer operable to execute example embodiments of this disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In this regard, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated example embodiments of the disclosure can be practiced in distributed computing environments where certain tasks are performed by remote processing devices that are linked through a communications network.

In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or" and it therefore interchangeable with the term "and/or". That is, unless specified otherwise, or clear from context, "X employs A or B" (or any like example) is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio unit, comprising:

at least one processor; and at least one memory that stores executable instructions that, when executed by the at least one processor, facilitate performance of operations, comprising:

receiving a signal formatted according to an open radio access network, wherein the signal is received from a distributed unit of the open radio access network and comprises control plane data;

determining that a target message, from the control plane data, indicates scheduling in a downlink direction and has a specified section type;

initializing respective counters for respective symbols that are scheduled, via the open radio access network, for transport between the distributed unit and the radio unit during a time division multiplexing unit of time, wherein a total number of the respective counters is a function of a cyclic prefix being used by the open radio access network for communication between the distributed unit and the radio unit; and performing a parsing procedure that parses the target message, the parsing procedure comprising:

identifying a symbol indicated by a message section of the target message;

determining a number of physical resource blocks for the symbol that is scheduled via the message section; and incrementing a counter, of the respective counters, that is associated with the symbol by the number of physical resource blocks.

2. The radio unit of claim 1, wherein the specified section type comprises a section type 1 message or a section type 3 message.

3. The radio unit of claim 1, wherein the total number of the respective counters is the function of the cyclic prefix and a multiplexing protocol applicable to the communication between the distributed unit and the radio unit.

4. The radio unit of claim 1, wherein the time division multiplexing unit of time is at least one of: a first unit of time applicable to a slot, a second unit of time applicable to a subframe, or a third unit of time applicable to a radio frame.

5. The radio unit of claim 1, wherein the symbol is a first symbol, wherein the number of physical resource blocks is a first number of physical resource blocks, wherein the counter is a first counter, and wherein the parsing procedure further comprises:

identifying a second symbol indicated by the message section of the target message;

determining a second number of physical resource blocks for the second symbol that is scheduled via the message section; and incrementing a second counter, of the respective counters, that is associated with the second symbol by the second number of physical resource blocks.

6. The radio unit of claim 5, wherein the message section of the target message is a first message section of a first target message, and wherein the parsing procedure further comprises:

identifying a third symbol indicated by a second message section of a second target message;

determining a third number of physical resource blocks for the third symbol that is scheduled via the second message section; and incrementing a third counter, of the respective counters, that is associated with the third symbol by the third number of physical resource blocks.

7. The radio unit of claim 1, wherein the operations further comprise performing a utilization procedure that determines a physical resource block utilization ratio on a per-symbol basis.

8. The radio unit of claim 7, wherein the physical resource block utilization ratio for the symbol is a quotient of the number of physical resource blocks that is scheduled for the symbol indicated by an associated counter of the respective counters divided by a maximum number of physical resource blocks for the respective symbols.

9. The radio unit of claim 7, wherein the operations further comprise iteratively performing the utilization procedure for each of the respective symbols, resulting in utilization ratio data on the per-symbol basis for the time division multiplexing unit of time.

10. The radio unit of claim 1, wherein the operations further comprise determining an average per-symbol utilization ratio over a specified amount of time, and wherein the specified amount of time is specified in units of clock time, a number of symbols, or units of time division multiplexing.

11. The radio unit of claim 10, wherein the function is a first function, and wherein the operations further comprise instructing a power amplifier of the radio unit to adaptively adjust a bias for the specified amount of time as a second function of the average per-symbol utilization ratio.

12. A non-transitory computer-readable medium comprising instructions that, in response to execution, cause a system comprising at least one processor to perform operations, comprising:

receiving a signal formatted according to an open radio access network, wherein the signal is received from a distributed unit of the open radio access network and comprises control plane data;

determining that a target message, from the control plane data, indicates scheduling in a downlink direction and is of section type 1 or section type 3;

initializing respective counters for respective symbols that are scheduled, via the open radio access network, for transport between the distributed unit and a radio unit during a time division multiplexing slot, wherein a total number of the respective counters is a function of a multiplexing protocol applicable to communication between the distributed unit and the radio unit;

identifying a symbol indicated by a message section of the target message;

determining a number of physical resource blocks for the symbol that is scheduled by the message section during the time division multiplexing slot; and incrementing a counter, of the respective counters, that is associated with the symbol by the number of physical resource blocks.

13. The non-transitory computer-readable medium of claim 12, wherein the symbol is a first symbol, wherein the number of physical resource blocks is a first number of physical resource blocks, wherein the counter is a first counter, and wherein the operations further comprise identifying a second symbol indicated by the message section of the target message, determining a second number of physical resource blocks for the second symbol that is scheduled by the message section, and incrementing a second counter, of the respective counters, associated with the second symbol by the second number of physical resource blocks.

14. The non-transitory computer-readable medium of claim 12, wherein the operations further comprise iteratively parsing additional target messages and incrementing the respective counters with associated physical resource block counts that are determined for the respective symbols.

15. The non-transitory computer-readable medium of claim 12, wherein the operations further comprise determining a physical resource block utilization ratio on a per-symbol basis.

16. A method, comprising:

receiving, by a device comprising a processor, control plane data that describes allocating of physical resource blocks to be subsequently communicated between a distributed unit and a radio unit via user plane data;

initializing, by the device, respective counters for respective symbols that are scheduled for transport between the distributed unit and the radio unit during a time division multiplexing unit of time, wherein a total number of the respective counters is a function of a cyclic prefix being used for communication between the distributed unit and the radio unit;

determining, by the device, that a target message, from the control plane data, indicates scheduling in a downlink direction and has a specified section type;

determining, by the device, a respective number of physical resource blocks for the respective symbols that is scheduled via the target message; and incrementing, by the device, the respective counters, associated with the respective symbols, by the respective number of physical resource blocks.

17. The method of claim 16, further comprising determining, by the device, a physical resource block utilization ratio for each of the respective symbols by dividing the respective number of physical resource blocks by a maximum number of physical resource blocks for the respective symbols.

18. The method of claim 16, further comprising determining, by the device, an average per-symbol utilization ratio over a specified amount of time, wherein the specified amount of time is specified in units of clock time, a number of symbols, or units of time division multiplexing.

19. The method of claim 18, wherein the function is a first function, and the method further comprising instructing, by the device, a power amplifier of the radio unit to adaptively adjust a bias for the specified amount of time as a second function of the average per-symbol utilization ratio.

20. The non-transitory computer-readable medium of claim 12, wherein the total number of the respective counters is the function of the multiplexing protocol and a cyclic prefix being used by the open radio access network for the communication between the distributed unit and the radio unit.

* * * * *